United States Patent [19]
Wilken

[11] Patent Number: 4,989,346
[45] Date of Patent: Feb. 5, 1991

[54] DRYER FOR PIECES OF FOOD
[75] Inventor: Leslie E. Wilken, Kewaunee, Wis.
[73] Assignee: Frank Hamachek Machine Company, Kewaunee, Wis.
[21] Appl. No.: 361,477
[22] Filed: Jun. 5, 1989
[51] Int. Cl.⁵ .............................................. F26B 19/00
[52] U.S. Cl. ........................................... 34/71; 34/95; 34/203
[58] Field of Search .................. 34/206, 207, 69, 71, 34/61, 203, 94, 95, 208, 115, 216

[56] References Cited
U.S. PATENT DOCUMENTS

| | | | |
|---|---|---|---|
| 1,787,063 | 12/1930 | Cano | 34/206 |
| 1,991,324 | 2/1935 | Keech | 34/71 |
| 2,472,794 | 6/1949 | Cothran . | |
| 2,732,631 | 1/1956 | Black | 34/219 |
| 2,795,056 | 6/1957 | Remer | 34/206 X |
| 3,113,875 | 12/1963 | Prater et al. . | |
| 3,879,858 | 4/1975 | Candor et al. | 34/115 X |
| 3,885,321 | 5/1975 | Fouineteau . | |
| 4,059,046 | 11/1977 | Yamazaki et al. . | |
| 4,067,318 | 1/1978 | Flaith et al. | 34/208 |
| 4,114,286 | 9/1978 | Bingham . | |
| 4,352,249 | 10/1982 | Rose | 34/216 |

Primary Examiner—Albert J. Makay
Assistant Examiner—John Sollecito
Attorney, Agent, or Firm—Wheeler Law Firm

[57] ABSTRACT

A device for drying pieces of food comprising a series of blowers, an absorbent multi-layered conveyor belt, and a aeration bed. Two blowers providing a blast of air and a suction, respectively, that pulls the water from the outer layers of the food through the absorbent conveyor belt and out of the machine. Another blower being positioned to blow the food pieces off the end of the conveyor belt on to the aereation bed for further processing and packaging. Another nozzle being positioned to blow the food pieces off the end of the conveyor belt on to the aereated (aeration) bed for further processing.

18 Claims, 2 Drawing Sheets

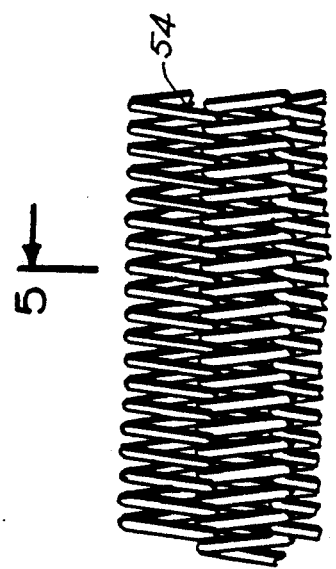
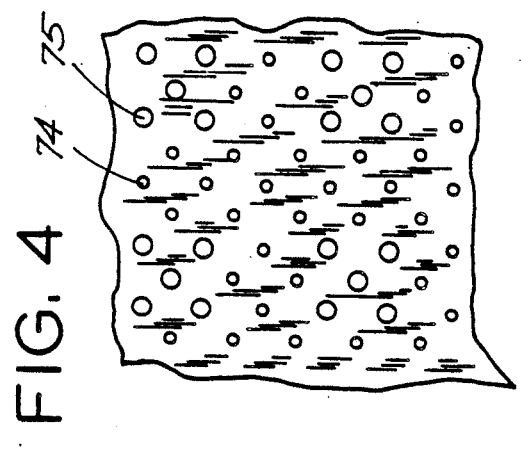
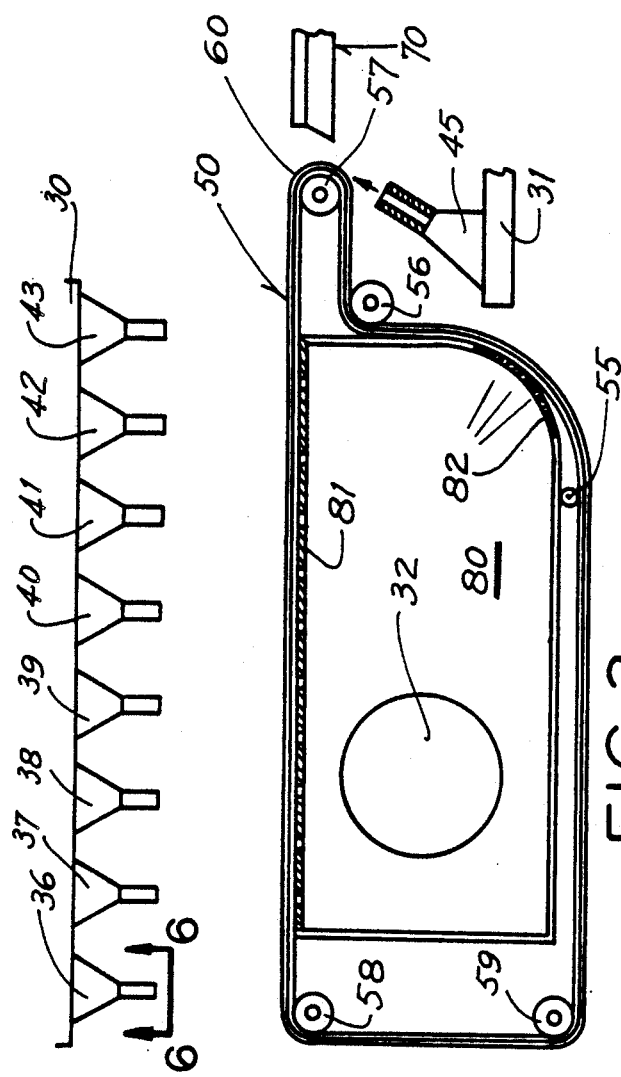
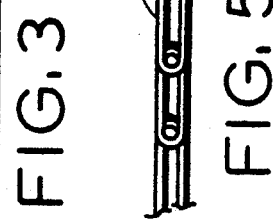
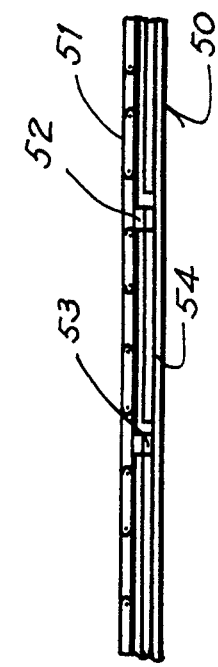

DRYER FOR PIECES OF FOOD

BACKGROUND OF THE INVENTION

The device of this invention relates to the field of vegetable dewatering. Specifically the device of this invention by a unique and simple design dewaters only the outer surface layers of the vegetable material. This process of dewatering greatly improves the shelf life of the vegetable matter while at the same time greatly reducing the period required to re-hydrate the vegetable so that it may be used in salads and so forth, principally in the fast food industry.

The inventor knows of no prior art which accomplishes the function of his invention in the same manner and by use of the same structure.

The inventor finds no instance in the following patents of the combination of air jets and vacuum along with an absorbent surface that he discloses. The closest reference is the prior art disclosed in the Cothran U.S. Pat. No. 2,472,794. Columns 3 and 4 Cothran do discuss the use of blasts of air along with contact to an absorbent material (with no vacuum) but Cothran teaches that these methods are ineffective. Cothran itself relies not upon concentrated air blasts but on air blown by a fan through an open hood and there is no absorbent material or vacuum chamber. Cothran does not disclose any references beyond those in columns 3 and 4, which Cothran says are ineffective, that show the use of a blast of air in conjunction with absorbent material. Cothran does not anywhere disclose the use of a vacuum chamber.

The Prater U.S. Pat. No. 3,113,875 has a good many air ducts but no blast except in FIG. 4 where there is no mechanical conveyor. The dried onions are conveyed by the air stream in that figure. Where there are conveyors there is no absorbent material and no vacuum chamber. Fouineteau U.S. Pat. No. 3,885,321, is simply a spin dryer. The Yamazaki U.S. Pat. No. 4,059,046, is not a dryer at all. Conveyors carry snack food through a deep fat frying tank and then through a cooler with the entire operation being conducted in a vacuum chamber. The only reference to drying is before the material reaches the apparatus. The Bingham U.S. Pat. No. 4,114,286 is yet another spin dryer. The Rose U.S. Pat. No. 4,352,249, merely uses a hood to direct curtain-like air streams. Probably the best drawing is a FIG. 6, which is described at column 5. The fruit is not sliced but has intact skins so that the drying problem is substantially different from that present with sliced fruit or vegetables. There is a discussion of slightly lower pressure in the drying chamber but there is no low pressure chamber below an absorbent surface to pull water through it, and no sliced work pieces which are exposed to air jets above and a vacuum chamber below the conveyor. In this prior art patent any vacuum disclosed surrounds the conveyor.

SUMMARY OF THE INVENTION

The term "dewater" means removal of water from the surfaces of the vegetables or workpieces in a range from removal of surface water only to some dehydration of the workpieces. This term, "dewater", has this meaning throughout, including the detailed description and claims.

This machine is designed to dewater the outer surfaces of vegetables, especially cut vegetables. This partial dewatering greatly extends the shelf life of the vegetables.

The machine is comprised of plenums, blowers, directional air nozzles, a vacuum chamber with a perforated housing, a continuous conveyor belt, and rollers on which the conveyor belt is mounted. The conveyor belt is comprised of layers. The top layer is a muslin belt. Attached to the underside of the top layer are strips of hook and loop fastener material. Directly below the muslin belt is a plastic belt that is made of an inter woven plastic material on top of which are mounted strips of complementary hook and loop material. The hook and loop fastener materials are what hold the muslin belt to the plastic belt. Other fastening systems may be used. The purpose of the hook and loop fasteners is to make it easy to change the muslin belt. This is necessary because the vegetable matter accumulating in the muslin is usually so great that eventually the muslin belt is removed for cleaning, or replaced due to wear. A fresh muslin belt is required and can easily be put in place in order to maintain the machine operations at maximum efficiency.

The muslin belt provides a highly absorbent surface having fine perforations which allow water to pass through but keep the vegetable matter on the conveyor belt. The plastic belt forming the bottom of the conveyor belt provides a surface having large perforations that will allow water to pass through and yet is durable enough to withstand the constant contact with the rollers that is required in order for the whole belt to function properly.

The machine functions in the following manner:

The blowers force large amounts of air into the plenums. Through one plenum air blows through directional nozzles located above the conveyor belt. This air blasts out in a high velocity stream which drives the water from the surface layers of the vegetable matter. This air velocity is so great that it would blow the vegetable matter from the belt if it were not for the vacuum chamber beneath the belt. The muslin absorbs or wicks water from the lower surface of the vegetable pieces. The vacuum chamber blowers remove the water through the conveyor belt and through the perforated housing of the vacuum chamber beneath the conveyor belt into the vacuum chamber itself. Within that vacuum chamber is an opening to which a blower is attached. This blower removes the air containing the water that was forced from the vegetable matter from the vacuum chamber. The combined effect of the continuously high velocity stream of air from the nozzles above the conveyor belt and the suction from the blower below the conveyor belt provides an efficient and unique system by which the outer surface layers of the vegetable matter are dewatered to the desired degree.

The vacuum created by the blower is sufficient so that the vegetable matter sticks to the muslin conveyor belt while surface water is absorbed by the muslin and removed by the air flow. In order to remove the vegetable matter pieces from the muslin conveyor belt a directional nozzle is located at the end of the muslin conveyor belt. The belt passes over a roll of small diameter to help free the vegetable pieces. As the vegetable matter approaches the small radius turn of the conveyor belt a continuous stream of high pressure air from another blower, through another plenum, is blown out of this directional nozzle at a tangent to the surface of the roller. This air causes the vegetable matter that is stuck to the muslin conveyor belt to be dislodged and blown onto a moving perforated aeration bed belt and expose product pieces to an air blast from below the belt for further drying, and for movement toward a packaging station. The moving aeration belt is provided with a pattern of smaller openings mixed with groups of larger openings forming the corners of squares, and larger openings at the center of each square to further remove water from the vegetable pieces.

The conveyor belt, after the vegetable workpieces are released, passes over a curved surface of the vacuum chamber which is perforated. Air passing through the belt and into the vacuum chamber further dries the muslin and makes it ready to receive more wet vegetable workpieces.

The following detailed description will show the structure and function of the invention in its most preferred embodiment.

DESCRIPTION OF THE DRAWINGS

FIG. 3 is a side plan view showing the relationship of the conveyor belt and the directional nozzles.

FIG. 4 is a top plan view of the conveyor belt without the muslin covering.

FIG. 5 is a view from line 5—5 of the figure.

FIG. 6 is a view from line 6—6 of FIG. 3.

FIG. 7 is a side cut-a-way view of the conveyor belt showing the different layers.

FIG. 8 is a close up view of the perforations in the conveyor belt on the aereation bed.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
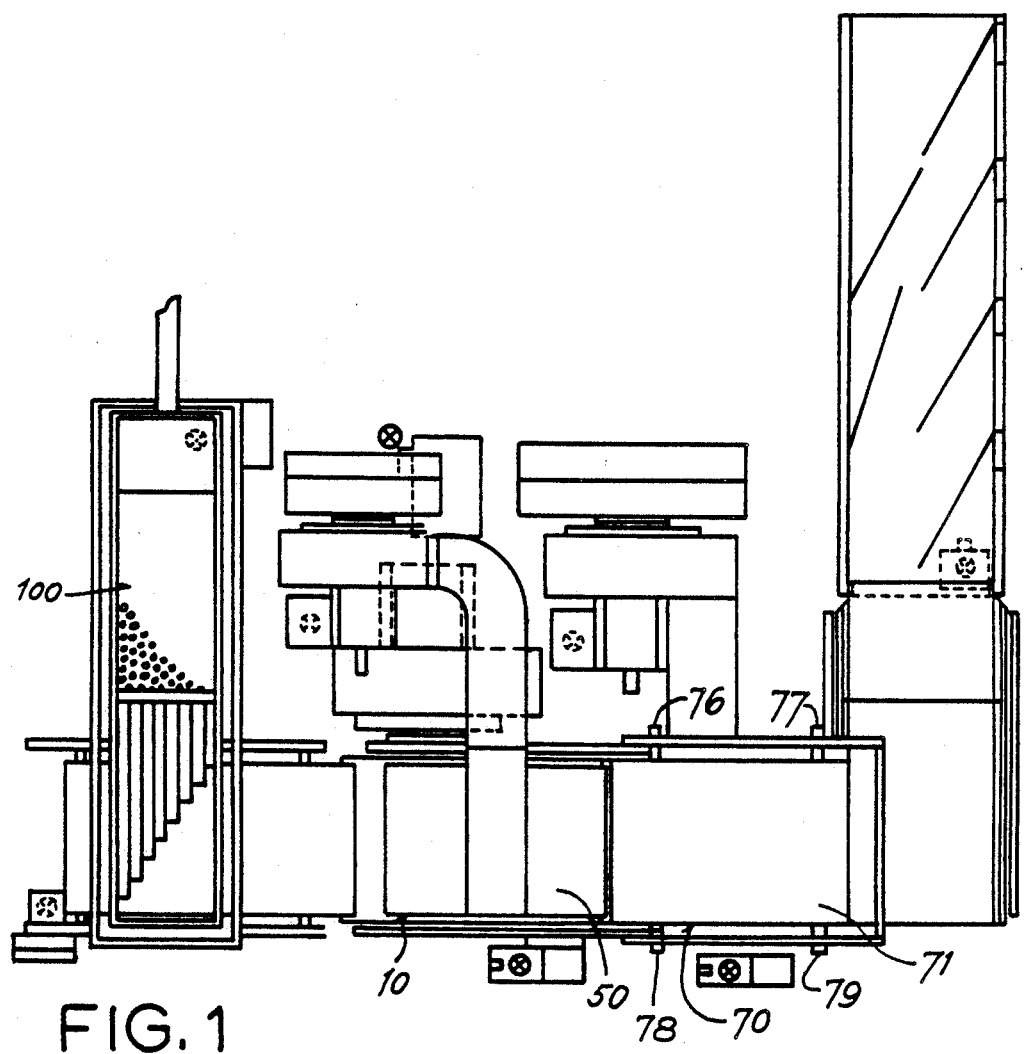
FIG. 1 a top plan view of the machine.
Figure 2:
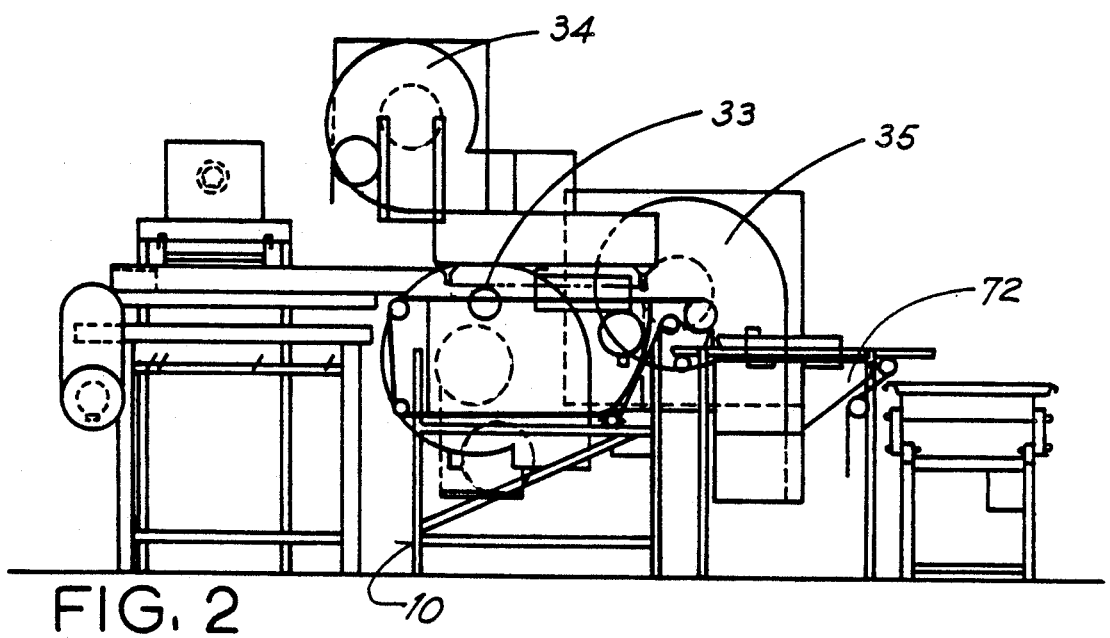
FIG. 2 is a side elevational view of the machine with the blower superimposed over it.

The device of the invention is a machine for partially dewatering the outer layers of vegetables. Specifically, the machine 10 dewaters the exposed outer surfaces of vegetables. The surface dewatering of vegetables is designed to enhance their shelf life. Referring to FIGS. 1, 2 and 3, the machine 10 is comprised of two blower plenums 30 and 31, a suction blower 33, two blowers 34 and 35, eight water removal nozzles 36–43, a dislodgment nozzle 45, a multi-layer conveyor belt 50, five rollers 55–59, a vacuum chamber 80, and an aereation bed 70.

FIGS. 2 and 3 illustrate the locations of the blowers 35 and 34, the suction blower 33, and the blower plenums 30 and 31.

Referring to FIG. 3, the relationship between the opening 32, the conveyor belt 50, the vacuum chamber 80, and the water removal nozzles 36–43 may be seen. The opening 32 of the suction blower 33 is contained within the vacuum chamber 80. Located directly above the conveyor belt 50 are the water removal nozzles 36–43. As illustrated by FIG. 6, the openings 90 to the water removal nozzles are narrow slots rectangular in shape. Furthermore, the openings 90 of the water removal nozzles are of such width that the entire width of the conveyor belt 50 that travels under each water removal nozzle 36–43 is covered by the blast of air that comes out of each nozzle 36–43. The water removal nozzles 36–43 are supplied with air from plenum 30 by the blower 34; see FIGS. 1 and 3.

Referring to FIG. 3, the vacuum chamber 80 has a perforated top plate 81 and a perforated curved portion 82. The perforated top plate 81 allows the water that is passing through the conveyor belt 50 to be pulled into the vacuum chamber 80. The perforated top plate 81 also allows the suction force of the vacuum chamber 80 to hold the vegetables on the conveyor belt 50. The perforated curved portion 82 allows the suction force of the vacuum chamber 80 to further dry the conveyor belt 50. It is important to note that if the vacuum chamber 80 did not provide sufficient suction to hold the vegetables on the belt 50 that the air blast from the nozzles 36–43 would cause the vegetables to be blown off the belt 50.

Still referring to FIG. 3, but also referring to FIG. 7, the conveyor belt 50 may be seen. The conveyor belt 50 is comprised of layers 51 and 54. The top layer of the conveyor belt 50 is a muslin cloth 51. The bottom layer of the conveyor belt 50 is a plastic belt 54. The muslin 51 is attached to the plastic belt 54 by means of hook strips 52 and loop strips 53 that are located between the muslin 51 and the plastic belt 54, the hook strips being sewn or attached directly to the muslin belt 51 and to the loop strips 53 being attached directly to the plastic belt 54. The muslin 51 is a material that is water absorbent and finely perforated due to the weave to allow water to pass through it. The plastic belt 54 is comprised of an interwoven network of plastic links 73; as illustrated in FIG. 4 and FIG. 5. These links 73 have large spaces between them in comparison to the perforations between the threads in the muslin 51. Other strong perforated structures could be used.

The muslin 51 is a material that is water absorbent and has fine perforations that allow water to pass through it but the perforations do not to allow the vegetables to pass through it. The large spaces in the plastic belt 54 also allow water to pass through the plastic belt 54. The hook strips 52 and the loop strip 53 are spaced so that they do not interfere with the passage of water through the muslin 51 and the plastic 54. The conveyor belt 50 is continuous, as illustrated in FIG. 3, and is stretched over the five rollers 55–59. Roller 57 provides the power that causes the belt to move.

Still referring to FIG. 3, dislodgment nozzle 45 may be seen at the end 60 next to the roller 57 of the conveyor belt 50. The nozzle 45 is pointed at an angle generally tangent to the surface of roller 57. The orientation of the nozzle 45 is such that the blast of air that is directed toward the end 60 will be an upward blast of air blowing the vegetable matter onto the aereation bed 70. Nozzle 45 is supplied with air from plenum 31 by blower 35. Also, a roller 57, located at end 60, over which the conveyor belt 50 rolls, is of a small diameter. The small size of the roller 57 means that the surface of the vegetable matter that is in contact with the belt 50 will be tangent to the surface of the belt 50 as it moves over the roller 57. This allows the air blown through nozzle 45 to more easily dislodge the vegetables from the belt 50.

Referring now to FIGS. 1 and 2 the relationship of the conveyor belt 50 and the aereation bed 70 may be seen. The conveyor belt 50 and the aereation bed 70 are located adjacent to each other with end 60 of the conveyor belt 50 being parallel to end 65 of the belt 71. The aereation bed 70 is comprised of a surface 71 that is mounted over posts 76–79 are attached at pivots 73 [not shown] to belt 71 and the plenum 72. The belt 71 is perforated; see FIG. 8. The perforations of the belt 71 are in rows that alternate between small perforations 74 and large perforations 75. The pattern of perforations is disclosed in FIG. 8 and is considered optimum for maximum product exposure to air blast. The posts 76–79 by moving in a back and forth motion shake any water still in contact or surrounding the vegetable loose. The water draining through perforations 74 and 75 and in to the plenum 72. The machine 10 works in the following manner:

Referring to FIG. 1, vegetables, for instance carrots, are sliced in a slicer (not shown), travel down aeration bed conveyor 100, and are deposited evenly on the conveyor belt 50. As the vegetables move down the conveyor belt 50 the nozzles 36–43 blast air onto the vegetables at such a velocity that the outer surfaces of the vegetables are dewatered. The water that is removed from the vegetables by the air blast from the nozzles 36–43 is partly evaporated and partly absorbed by the muslin and sucked through the conveyor belt 50 and out through the opening 32 by the suction blower 34. The suction upon the belt 50 is so great that the vegetables remain on the belt 50. To dislodge the vegetables from the belt 50 the nozzle 45, located at the end 60 of the conveyor belt 50 between the conveyor belt 50 and the aeration bed 70, is used. Air is pushed through the nozzle 45 at high velocity and the vegetables that are stuck to the conveyor belt 50 are removed and turned and deposited on to the aeration bed belt 70. Further water removal to the desired degree, is accomplished as the product travels through the aereation bed on surface 70. The perforations in surface belt 70 are designed to provide maximum exposure of the product to the air blast.

An over all pattern of smaller holes 74 is interrupted by patterns of larger holes 75 at the corners and centers of squares. The water remaining to achieve dewatering, is removed from the vegetables as they are carried over the surface 70 on the aeration belt 71. The water travels through perforations 74 and 75 in the shaker 71. These perforations are designed to give maximum water removal capability to the aeration belt 71.

The above described embodiments of this invention are merely descriptive of its principles and are not to be limiting. The scope of this invention instead shall be determined from the scope of the following claims, including their equivalents.

For the purpose of simplicity, the word absorbent, as used in the claims, shall include within its meaning the meaning of the word adsorbent. Also the terms gas and liquid are intended to have their plural as well as their singular meaning.

What is claimed is:

1. A device for removing liquids from the outer layers of the exposed surfaces of workpieces comprising:
   at least one liquid absorbent workpiece moving means;
   a plurality of means capable of delivering a stream of gas with sufficient force whereby said liquid on or in said outer layers of said workpieces is removed by said stream of gas delivered from at least one of said means capable of delivering a stream of gas;
   a plurality of plenums;
   a plurality of means capable of directing said gas toward said workpieces;
   said liquid removed from said workpieces being absorbed by and passing through said liquid absorbent means;
   said liquid in said liquid absorbent means being removed from said liquid absorbent means and removed from said device by at least one of the said means capable of delivering a stream of gas through at least one opening;
   whereby the outer surfaces of the wet workpieces are free from liquids to the extent desired.

2. The device of claim one in which at least one of said plurality of liquid absorbent workpiece moving means is a conveyor belt having a plurality of layers;
   said layers being porous;
   said layers being held together by fastening means.

3. The device of claim 2 in which said conveyor belt comprises a top and a bottom layer;
   said fastening means being hook and loop fasteners;
   said hook and loop fasteners being strips;
   said hook and loop fastening strips being attached to said top and bottom layers of said conveyor belt;
   said hook side of each strip being attached to one layer of said conveyor belt while the loop side of said hook and loop fastening strips being attached to the other layer of said conveyor belt such that said hook side strips are able to engage said loop side strips.

4. The device of claim 1 in which said means capable of delivering a stream of gas are blowers.

5. The device of claim 1 in which the means capable of delivering a stream of gas are compressors.

6. The device of claim 4 in which said blowers have electric motors.

7. The device of claim 5 in which said electric motors run on DC or direct current;
   whereby speed of the motors may be easily varied.

8. The device of claim 4 in which said blowers blows generally clean gas.

9. The device of claim 1 in which at least one said means capable of delivering a stream of gas moves a mixture of liquid and gas by creating a vacuum in a vacuum chamber.

10. The device of claim 8 in which said means capable of delivering a stream of gas is a blower; said blower being located below said liquid absorbent work piece moving means.

11. The device of claim 1 having an aeration bed, a blower with a directional nozzle;
    said aeration bed having a perforated surface;
    said surface having a receiving end;
    said receiving end being located at one end of said workpiece moving means;
    said nozzle being orientated so as to blow said workpieces onto said surface;
    said surface receiving said workpieces from said workpiece moving means;
    said perforations in said surface being of varying sizes;
    said surface being a surface that moves and dries said workpieces by exposure to an air blast from below.

12. The device of claim 11 in which said perforations are of two different sizes, large and small;
    said perforations arranged in a pattern;
    said large perforations being in groups of four large perforations located at the corners of squares and said small, fifth, perforation being located at the center of each said square;

said squares being separated from each other by three rows and three columns of small perforations.

13. The device of claim 8 in which said vacuum chamber has a housing; said housing having a perforated top; said housing also having a perforated portion of a side and a bottom.

14. The device of claim 1 in which said means capable of delivering a stream of gas have engines.

15. The device of claim 1 in which said means capable of delivering a stream of gas have means to vary the rate of gas movement.

16. A device for removing liquids from the outer layers of the exposed surfaces of workpieces comprising:
- at least one liquid absorbent workpiece moving means; a plurality of means capable of delivering a stream of gas with sufficient force whereby said liquid on or in said outer layers of said workpieces is removed by said stream of gas delivered from at least one of said means capable of delivering a stream of gas;
- a plurality of plenums;
- a plurality of means capable of directing said gas toward said workpieces;
- said liquid removed from said workpieces being absorbed by and passing through said liquid absorbent means;
- said liquid in said liquid absorbent means being removed from said liquid absorbent means and removed from said device by at least one of the said means capable of delivering a stream of gas through at least one opening;
- said liquid absorbent workpiece moving means being a conveyor belt having a plurality of porous layers held together by fastening means;
- said layers including an absorbent upper layer and a lower support layer;
- said fastening means being hook and loop fastener strips;
- one of said hook fasteners and said loop fasteners being attached to each of said upper and lower layers of said conveyor belt in complimentary engaging positions;
- whereby the outer surfaces of the wet workpieces are freed from liquids to the extent desired.

17. A device for removing liquids from the outer layers of the exposed surfaces of workpieces comprising:
- at least one liquid absorbent workpiece moving means;
- a plurality of means capable of delivering a stream of gas with sufficient force whereby said liquid on or in said outer layers of said workpieces is removed by said stream of gas delivered from at least one of said means capable of delivering a stream of gas;
- a plurality of plenums;
- a plurality of means capable of directing said gas toward said workpieces;
- an aeration bed;
- said liquid removed from said workpieces being absorbed by and passing through said liquid absorbent means;
- said liquid in said liquid absorbent means being removed from said liquid absorbent means and removed from said device by at least one of the said means capable of delivering a stream of gas through at least one opening;
- said aeration bed having a perforated surface;
- said perforated surface having a receiving end;
- said receiving end being located at one end of said workpiece moving means;
- at least one said gas directing means being orientated so as to blow said workpieces onto said perforated surface;
- said perforated surface receiving said workpieces form said workpiece moving means;
- said perforations in said perforated surface being of varying sizes;
- said perforated surface being a surface that moves and dries said workpieces by exposure to an air blast from below.

18. A device for removing liquids from the outer layers of the exposed surfaces of workpieces comprising:
- at least one liquid absorbent workpiece moving means;
- a plurality of means capable of delivering a stream of gas with sufficient force whereby said liquid on or in said outer layers of said workpieces is removed by said stream of gas delivered from at least one of said means capable of delivering a stream of gas;
- a plurality of plenums;
- a plurality of means capable of directing said gas toward said workpieces;
- an aeration bed;
- said liquid removed from said workpieces being absorbed by and passing through said liquid absorbent means;
- said liquid in said liquid absorbent means being removed from said liquid absorbent means and removed from said device by at least one of the said means capable of delivering a stream of gas through at least one opening;
- said aeration bed having a perforated surface;
- said perforated surface having a receiving end;
- said receiving end being located at one end of said workpiece moving means;
- at least one said gas directing means being orientated so as to blow said workpieces onto said perforated surface;
- said perforated surface receiving said workpieces form said workpiece moving means;
- said perforations in said perforated surface being of varying sizes;
- said perforated surface being a surface that moves and dries said workpieces by exposure to an air blast from below;
- said perforations being of at least two different sizes, large and small;
- said perforations arranged in a pattern;
- said large perforations being in groups of four large perforations located at the corners of squares and said small, fifth, perforation being located at the center of each said square;
- said squares being separated from each other by three rows and three columns of small perforations.

* * * * *